United States Patent
Nagano et al.

(10) Patent No.: US 10,708,064 B2
(45) Date of Patent: Jul. 7, 2020

(54) SEMICONDUCTOR DEVICE, BOOT METHOD, AND BOOT PROGRAM

(71) Applicant: Renesas Electronics Corporation, Tokyo (JP)

(72) Inventors: Seishiro Nagano, Tokyo (JP); Shigenori Miyauchi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 227 days.

(21) Appl. No.: 15/906,070

(22) Filed: Feb. 27, 2018

(65) Prior Publication Data

US 2018/0331834 A1 Nov. 15, 2018

(30) Foreign Application Priority Data

May 12, 2017 (JP) ................................. 2017-095295

(51) Int. Cl.
*H04L 9/32* (2006.01)
*H04L 9/30* (2006.01)
*G06F 9/4401* (2018.01)

(52) U.S. Cl.
CPC .......... *H04L 9/3247* (2013.01); *G06F 9/4401* (2013.01); *H04L 9/30* (2013.01); *H04L 9/3242* (2013.01)

(58) Field of Classification Search
CPC ....... H04L 9/3247; H04L 9/3242; H04L 9/30; G06F 9/4401
See application file for complete search history.

(56) References Cited

U.S. PATENT DOCUMENTS

| 8,555,049 B2 | 10/2013 | Takayama et al. |
| 2014/0230052 A1* | 8/2014 | Zhang ................... G06F 21/575 726/22 |
| 2015/0046717 A1* | 2/2015 | Hagiwara ............. G06F 21/575 713/187 |

FOREIGN PATENT DOCUMENTS

WO 2009/044533 A1 4/2009

* cited by examiner

*Primary Examiner* — Nelson S. Giddins
(74) *Attorney, Agent, or Firm* — McDermott Will & Emery LLP

(57) ABSTRACT

To shorten a processing time at boot time without lowering a security level, an acquiring unit acquires a public key, a signature generated with a secret key corresponding to the public key, and a program associated with the signature. A signature verification unit performs signature verification by using the public key and the signature acquired by the acquiring unit, before the program acquired by the acquiring unit is booted. A calculation unit calculates a first MAC value by using a device eigenvalue and stores the first MAC value, when the result of signature verification by the signature verification unit is appropriate. A boot unit calculates a second MAC value by using the device eigenvalue, compares the second MAC value and the stored first MAC value with each other to determine that the program is legitimate, and executes boot based on the determination result.

4 Claims, 21 Drawing Sheets

FIG. 9A

SIGNATURE VERIFICATION:
| HASH OPERATION | PUBLIC KEY OPERATION | COMPARISON | PROGRAM EXECUTION |

ABOUT 1.05M  ABOUT 1.08M

FIG. 9B

SIGNATURE VERIFICATION:
| HASH OPERATION | PUBLIC KEY OPERATION | COMPARISON | PREDETERMINED PROCESSING |

ABOUT 1.05M  ABOUT 1.08M

FIG. 9C

MAC VERIFICATION:
| MAC OPERATION | COMPARISON | PROGRAM EXECUTION |

ABOUT 0.66M

FIG. 17A

SIGNATURE VERIFICATION:
- DECRYPTION
  - COMMON KEY OPERATION — ABOUT 0.66M
  - HASH OPERATION — ABOUT 1.05M
- PUBLIC KEY OPERATION — ABOUT 1.08M
- COMPARISON
- PROGRAM EXECUTION

FIG. 17B

SIGNATURE VERIFICATION:
- DECRYPTION
  - COMMON KEY OPERATION — ABOUT 0.66M
  - HASH OPERATION — ABOUT 1.05M
- PUBLIC KEY OPERATION — ABOUT 1.08M
- COMPARISON
- PREDETERMINED PROCESSING

FIG. 17C

MAC VERIFICATION:
- DECRYPTION + MAC OPERATION — ABOUT 1.37M
- COMPARISON
- PROGRAM EXECUTION

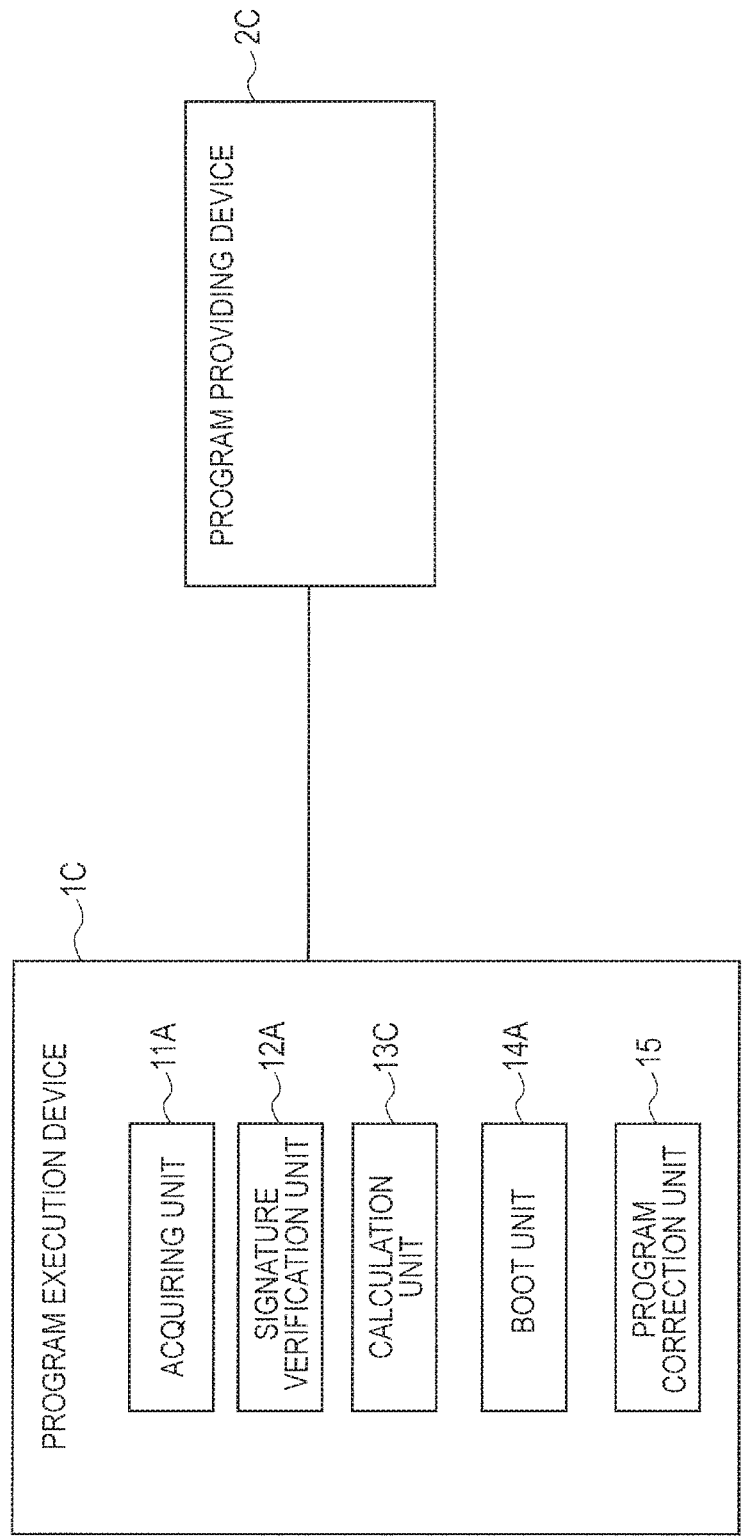

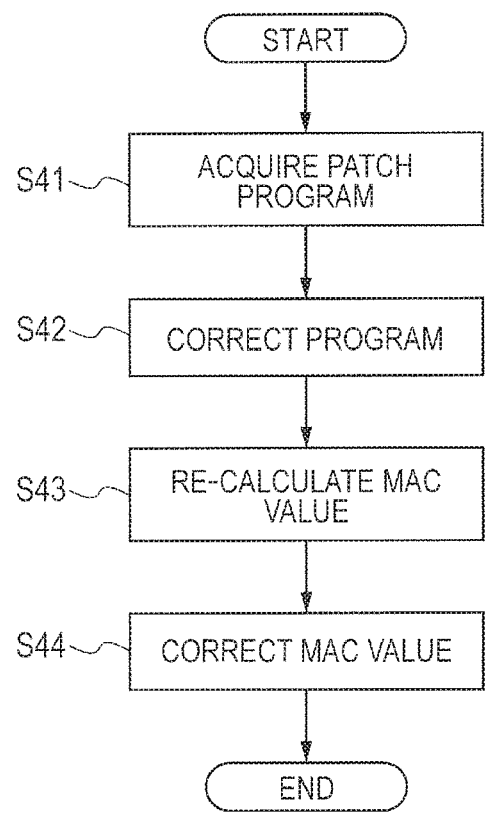

SEMICONDUCTOR DEVICE, BOOT METHOD, AND BOOT PROGRAM

CROSS-REFERENCE TO RELATED APPLICATIONS

The disclosure of Japanese Patent Application No. 2017-095295 filed on May 12, 2017 including the specification, drawings and abstract is incorporated herein by reference in its entirety.

BACKGROUND

The present invention relates to a semiconductor device, a boot method, and a boot program.

A demand for preventing an embedded device or the like from executing a program created or tampered by a third party (an unintended person) is increasing in recent years. One of techniques achieving this demand is secure boot that checks and verifies program integrity (for example, see WO/2009/044533). Specifically, WO/2009/044533 describes performing a Hash operation for a code image of a software module at boot time and collates the result of the Hash operation and a measured value of a certificate.

SUMMARY

However, a Hash operation requires a longer operation time that is in proportion to the size of a program to be activated. Therefore, when the size of the program is large, a processing time for executing boot becomes long. Thus, it is demanded to shorten the processing time at boot time without lowering a security level.

Other objects and novel features will be apparent from the description of this specification and the accompanying drawings.

A summary of a typical one of the inventions in disclosed the present application is briefly explained below.

In a semiconductor device according to an embodiment, an acquiring unit acquires a public key, a signature generated with a secret key corresponding to the public key, and a program associated with the signature. A signature verification unit performs signature verification by using the public key and the signature acquired by the acquiring unit, before the program acquired by the acquiring unit is booted. A calculation unit calculates a determination value for determining that the program is legitimately manufactured and is not tampered, by using information identifying its own device and stores the determination value, when the signature is verified to be appropriate by the signature verification unit. A boot unit recalculates the determination value by using the information identifying its own device, performs a determination process that compares the recalculated determination value and the stored determination value with each other to determine that the program is legitimately manufactured and is not tampered, and executes boot based on a result of the determination.

According to the embodiment, it is possible to shorten a processing time at boot time without lowering a security level.

BRIEF DESCRIPTION OF THE DRAWINGS

FIGS. 9A to 9C illustrate a comparative example of a processing time in the first embodiment.

FIGS. 17A to 17C illustrate a comparative example of a processing time in the second embodiment.

FIG. 18 illustrates the outline of a configuration example of a program execution device according to a third embodiment.

FIG. 21 is a flowchart of a procedure of a process in which, when acquiring the patch, the program execution device reflects correction of a program and updates the first MAC value.

DETAILED DESCRIPTION

Embodiments of the present invention are described in detail below, with reference to the drawings. Throughout the drawings for explaining the embodiments, the same portions are labeled with the same reference signs in principle and repetition of the description is omitted. Meanwhile, a portion in a certain drawing, described with a certain reference sign labeled thereto, may be referred to again with the same reference sign in the description of another drawing, although not illustrated again.

First Embodiment

Figure 1:
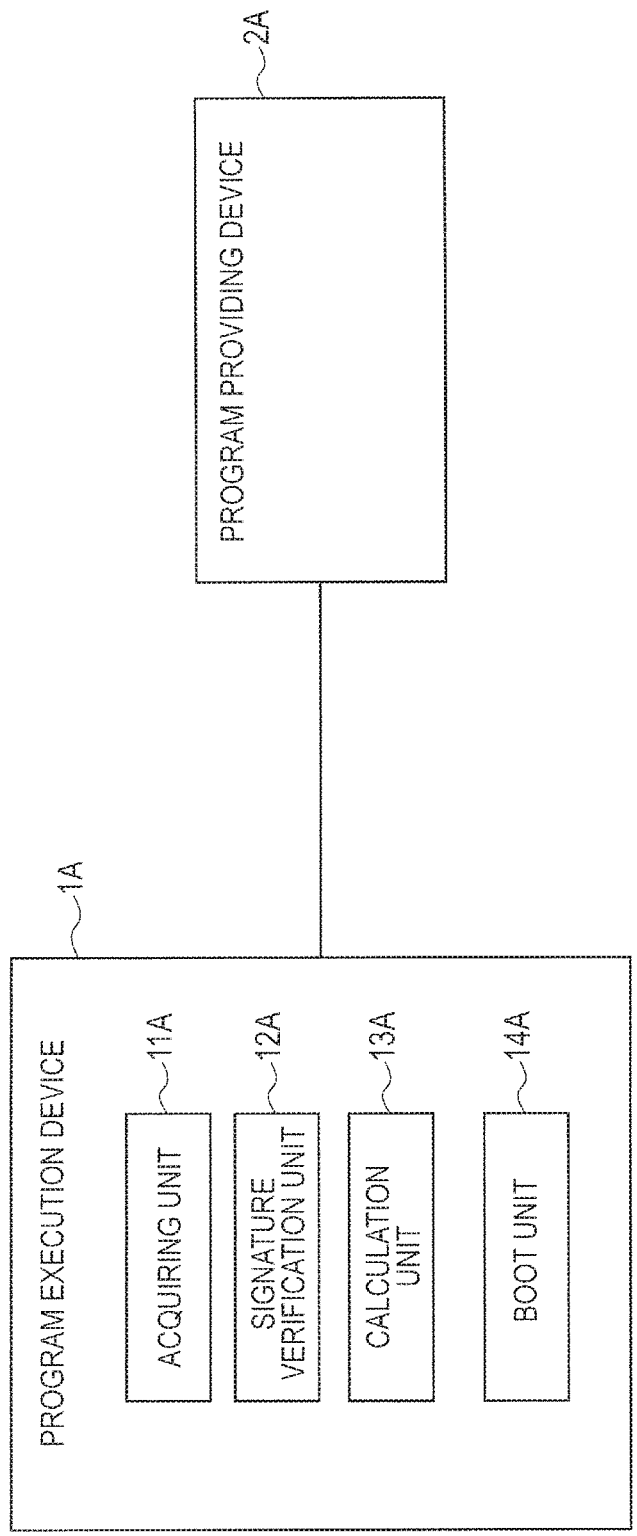
FIG. 1 illustrates the outline of a configuration example of a program execution device in a first embodiment.

FIG. 1 illustrates the outline of a configuration example of a program execution device of a first embodiment. A program execution device 1A of the first embodiment, includes an acquiring unit 11A, a signature verification unit 12A, a calculation unit 13A, and a boot unit 14A. The program execution device 1A is coupled to a program providing device 2A by wire or wirelessly and can transmit and receive information to/from the program providing device 2A, The program execution device 1A is a device that executes a boot target program (e.g., an application program that executes a service to be provided to an end user), and is an information processing device, a semiconductor device, or the like that can execute that boot target program. Here, "boot" means to execute a boot target program or places it in an executable state. The program execution device 1A is a personal computer, a cellular phone, and the like. The program execution device 1A may be a computer for controlling an industrial machine, an automobile, and the like. The program execution device 1A may be implemented by a plurality of devices.

The program providing device 2A is a device that provides (transmits) a boot target program or a boot program (a program that executes boot) to the program execution device 1A, and is an information processing device, a semiconductor device, and the like. The program providing device 2A is a personal computer, a server device, and the like. The program providing device 2A may be implemented by a plurality of devices. For example, the program providing device 2A may be implemented by devices of different business operators.

The acquiring unit 11A is a unit that acquires a public key, a signature generated with a secret key corresponding to that public key, and a boot target program associated with that signature. Specifically, the acquiring unit 11A acquires a boot program including the public key from the program providing device 2A and stores that boot program. The acquiring unit 11A also acquires the boot target program and the signature of that boot target program from the program providing device 2A and stores the boot target program and the signature.

Figure 2:
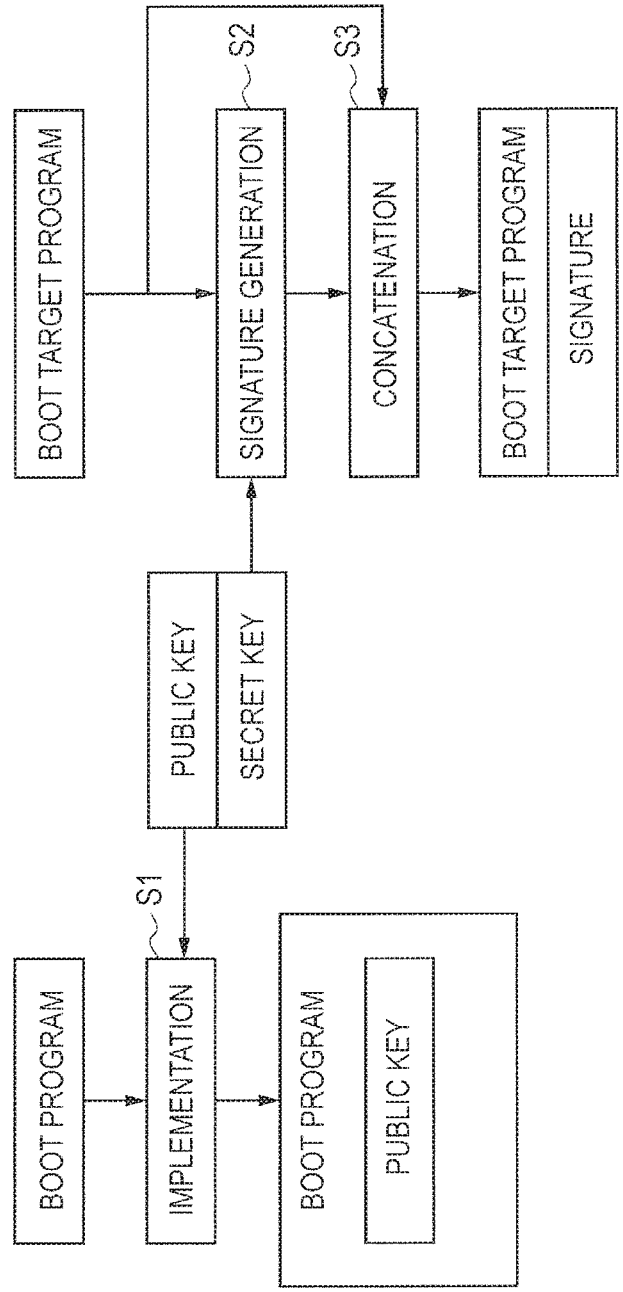
FIG. 2 is a conceptual diagram of a procedure of generating a program to be transmitted to the program execution device, by a program providing device in the first embodiment.

Here, a procedure in which the program providing device 2A generates a program to be transmitted to the program execution device 1A is described with reference to FIG. 2. FIG. 2 is a conceptual diagram of the procedure in which the program providing device 2A generates a program to be transmitted to the program execution device 1A.

It is assumed that the program, providing device 2A retains a public key and a secret key corresponding to that public key. The program providing device 2A also retains a boot program and a boot target program.

First, the program providing device 2A implements the public key in the boot program (Step S1). Subsequently, the program providing device 2A performs an operation using the secret key for a result of a Hash operation for the entire boot target program, thereby generating a signature (Step S2). The program providing device 2A then performs a process of associating the boot target program and the signature with each other (concatenation) (Step S3).

In this manner, the program providing device 2A generates the boot program including the public key and associates the boot program and the signature with each other. Also, the program providing device 2A transmits that boot program to the program execution device 1A, and transmits the boot target program and the signature that are associated with each other to the program execution device 1A.

Returning to FIG. 1, the signature verification unit 12A is a unit that performs signature verification by using the public key and the signature acquired by the acquiring unit 11A before the boot target program acquired by the acquiring unit 11A is booted. Specifically, the signature verification unit 12A performs an operation using the public key for the result of the Hash operation for the entire boot target program before boot, thereby performing signature verification. When the result of signature verification is appropriate, the signature verification unit 12A notifies the calculation unit 13A of that result. When the result of signature verification is not appropriate, the signature verification unit 12A performs an error process, for example, outputs that the signature is not appropriate.

When the result of signature verification by the signature verification unit 12A is appropriate, the calculation unit 13A calculates a determination value for determining that the boot target program is legitimately manufactured and is not tampered, by using information for identifying its own device (a device eigenvalue), and stores that determination value.

When receiving that the result of signature verification is appropriate from the signature verification unit 12A, the calculation unit 13A generates the device eigenvalue. The calculation unit 13A generates information obtained by combining a generation date and time and a random number, for example, as the device eigenvalue. The calculation unit 13A then calculates a MAC value (first MAC value) of the boot target program based on that device eigenvalue as the determination value, and stores that MAC value. This MAC value is a value that enables determination that the boot target program is legitimate and detection of tampering. The calculation unit 13A may replace the stored signature with the MAC value. Alternatively, a value other than the MAC value, which enables determination that a program is legitimate and detection of tampering, may be applied.

The boot unit 14A is a unit that performs a boot process for the boot target program. Specifically, the boot unit 14A calculates the MAC value (second MAC value) again by using the device eigenvalue when the boot target program is booted (for example, when the program execution device 1A is turned on or when the program execution device 1A is reset (restarted)). The boot unit 14A then performs a determination process (MAC verification) that compares the second MAC value and the stored first MAC value with each other to determine that the boot target program is legitimate and is not tampered, and executes boot based on a result of this determination.

<Hardware Configuration Diagram of Program Execution Device>

Figure 3:
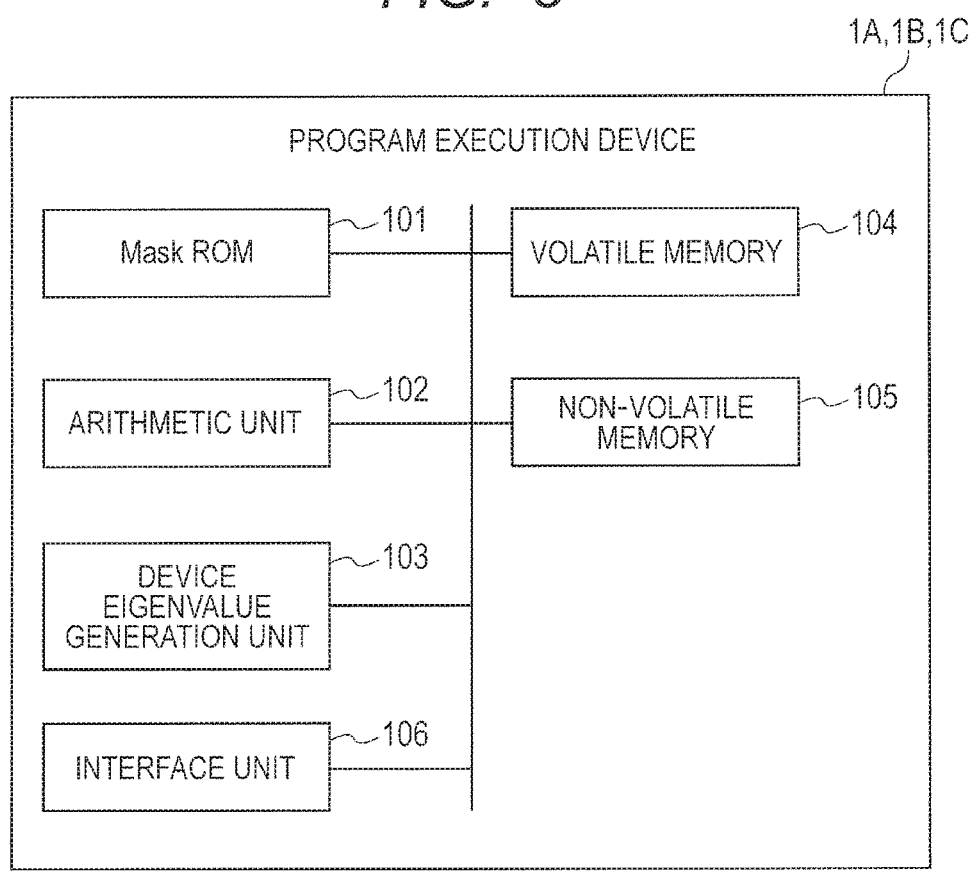
FIG. 3 is a hardware configuration diagram of the program, execution device.

Next, a hardware configuration diagram of a program execution device 1 (program execution devices 1A, 1B, and 1C) is described. The program execution device 1 is configured as a computer system that includes a Mask ROM 101, an arithmetic unit 102, a device eigenvalue generation unit 103, a volatile memory 104, a non-volatile memory 105, and an interface unit 106, as illustrated in FIG. 3. The interface unit 106 is an interface, such as a communication interface, that receives an input and an output to/from an external device. The program execution device 1 causes a predetermined program (a boot program, a boot target program, and the like) to be read on hardware, i.e., the Mask ROM 101, the arithmetic unit 102, the volatile memory 104, and the non-volatile memory 105 illustrated in FIG. 3, thereby causing the device eigenvalue generation unit 103 and the interface unit 106 to operate under control by the arithmetic unit 102. In place of the Mask ROM 101, a storage device with a limited opportunity of storing data therein, such as an OTPROM (One Time Programmable ROM), may be applied.

<Data Transition of Boot Target Program and Other Data>

Figure 4:
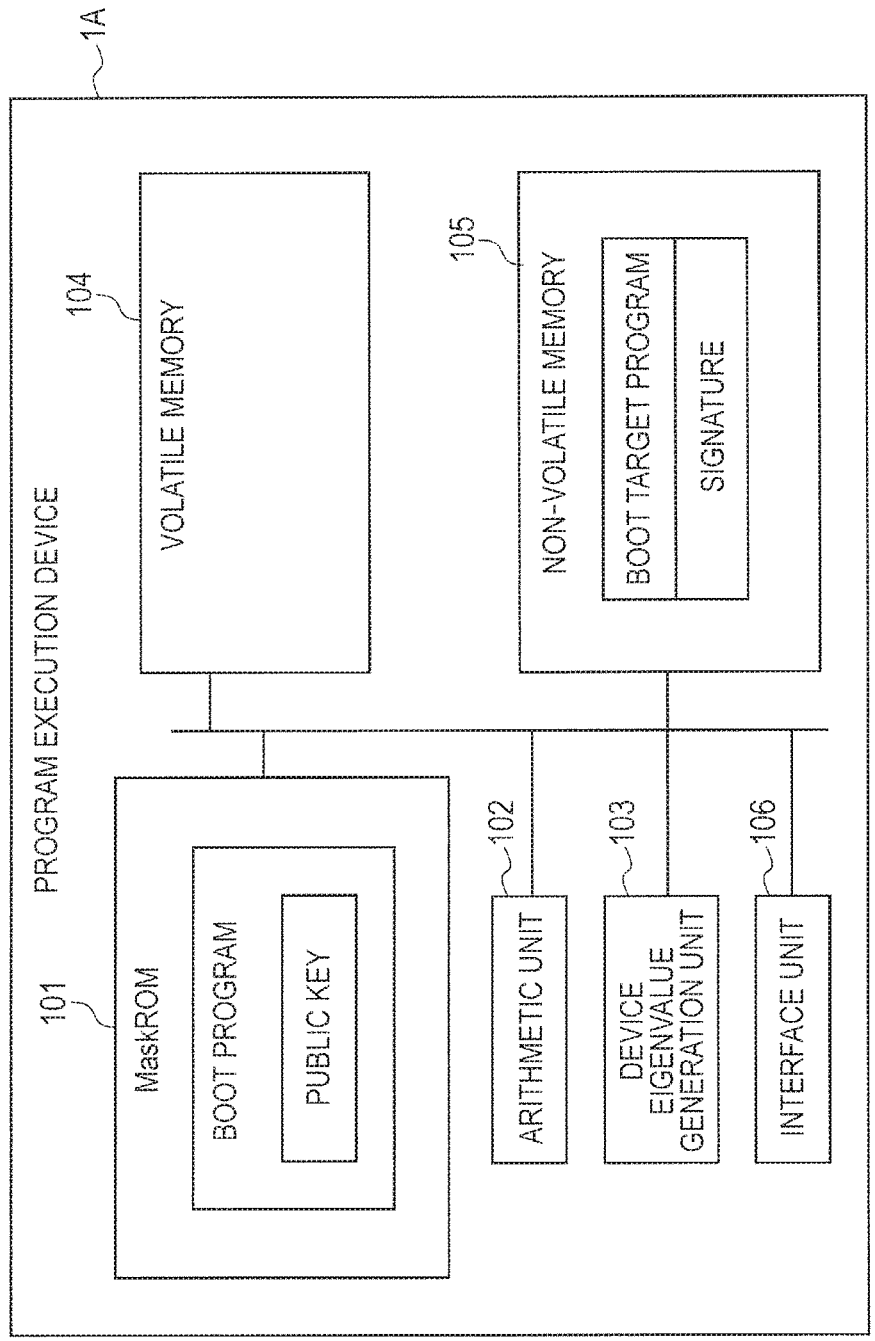
FIG. 4 illustrates a storage state when a boot program, a boot target program, and a signature are acquired in the first embodiment.

Next, data transition of a boot target program and other data until boot is executed, with reference to FIGS. 4 to 7, First, FIG. 4 illustrates a storage state when a boot program, a boot target program, and a signature are acquired. When acquiring the boot program, the boot target program, and the signature from the program providing device 2A via the interface unit 106, the arithmetic unit 102 stores the boot program in the Mask ROM 101. The arithmetic unit 102 stores the boot target program and the signature in the non-volatile memory 105. In this manner, the arithmetic unit 102 and the interface unit 106 function as the acquiring unit 11A.

Figure 5:
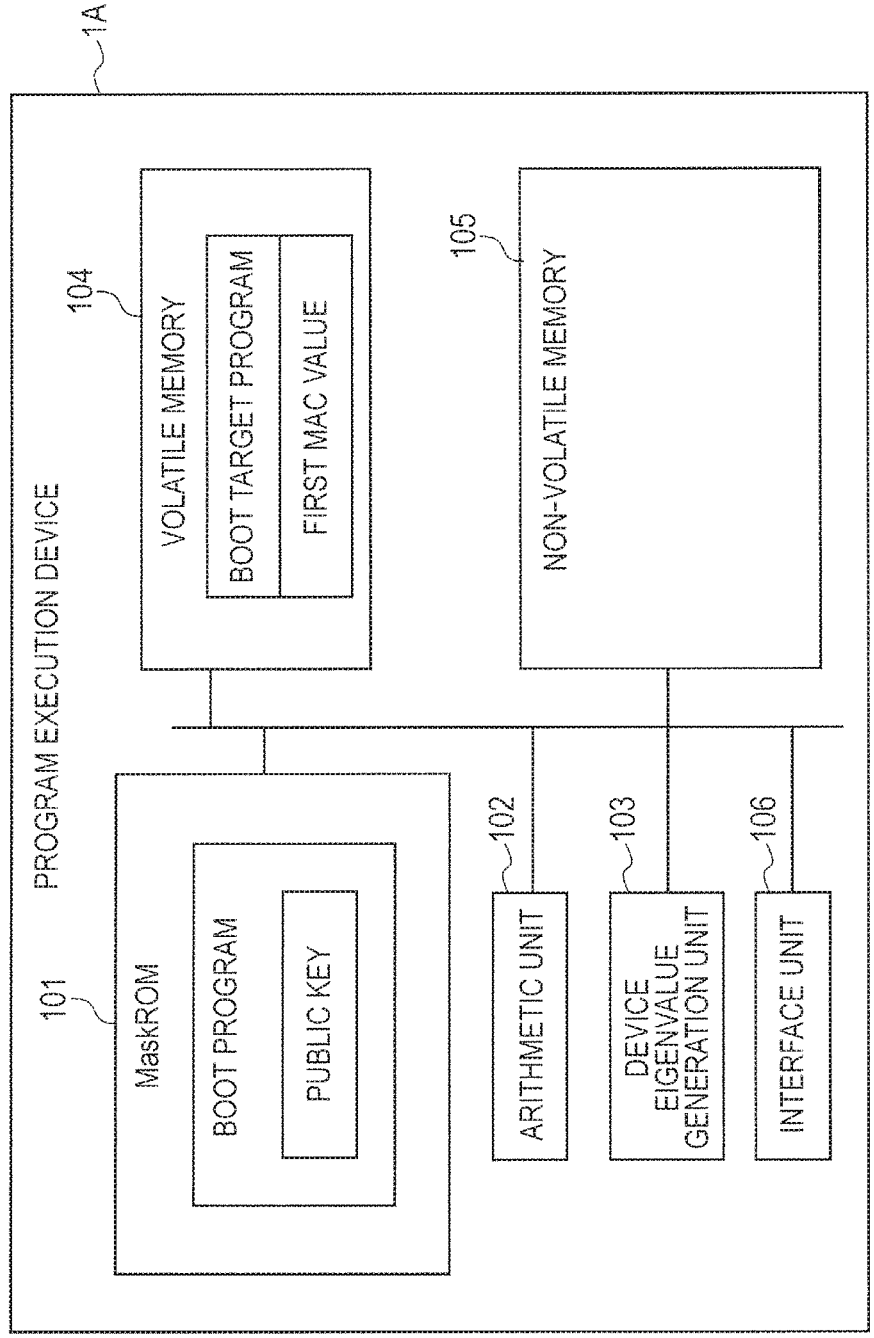
FIG. 5 illustrates a state when signature verification is performed and a MAC value before boot is calculated in the first embodiment.

Next, a state when signature verification is performed and a MAC value before boot (first MAC value) is calculated is illustrated in FIG. 5. In signature verification, the arithmetic unit 102 executes the boot program, and moves or copies the boot target program and the signature stored in the non-volatile memory 105 to the volatile memory 104. An example of techniques of moving or copying data to the volatile memory 104 is to refer to a pre-stored configuration file and perform moving or copying.

The arithmetic unit 102 executes the boot program and performs an operation using a public key for a result of a Hash operation performed for the entire boot target program, thereby performing signature verification. In this manner, the arithmetic unit 102 functions as the signature verification unit 12A. When this signature verification is appropriate, the device eigenvalue generation unit 103 calculates a device eigenvalue and the arithmetic unit 102 calculates the first MAC value of the boot target program based on that device eigenvalue. In this manner, the arithmetic unit 102 and the device eigenvalue generation unit 103 function as the calculation unit 13A.

Figure 6:
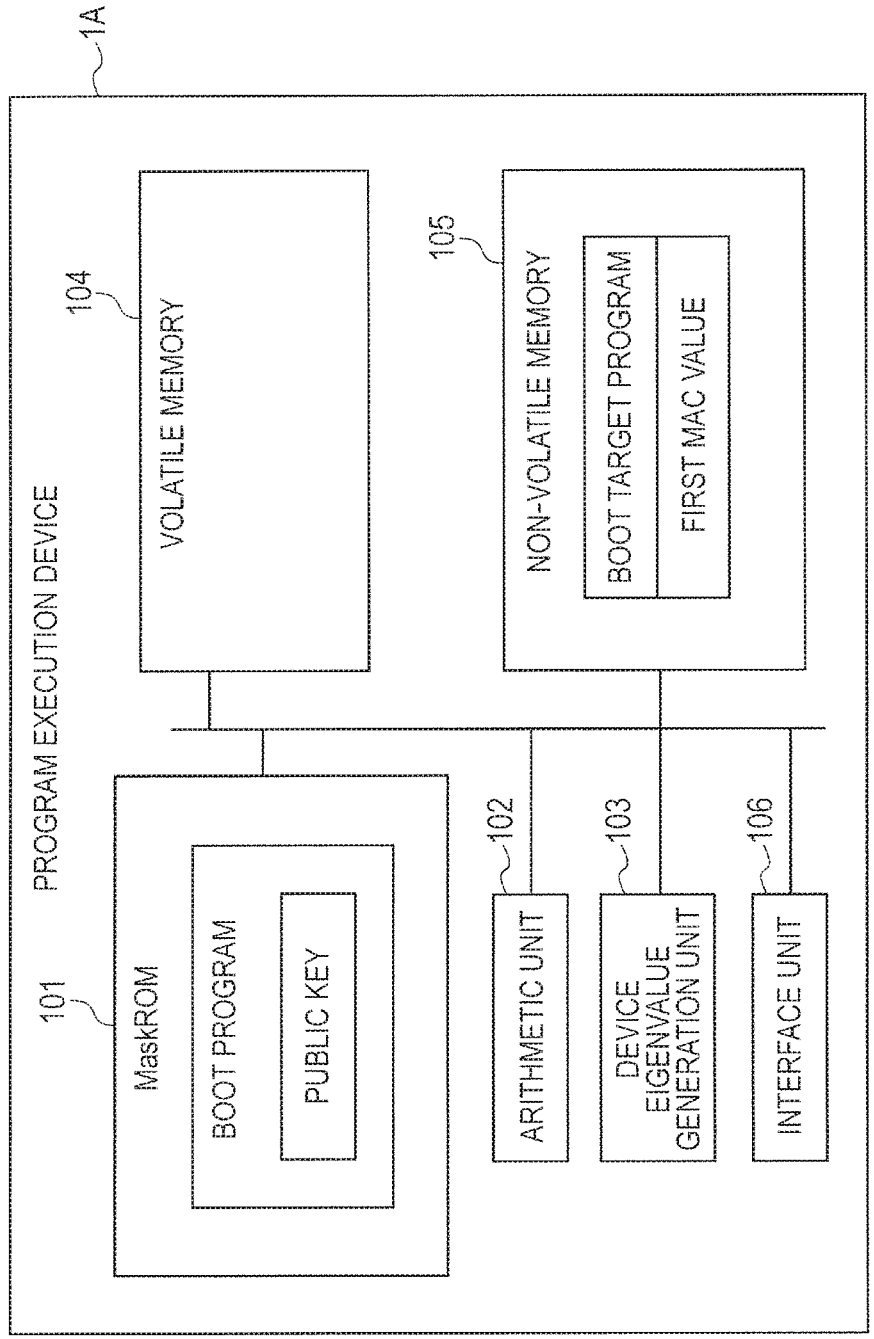
FIG. 6 illustrates a storage state of the boot target program and a first MAC value before boot in the first embodiment.

Next, a storage state of the boot target program and the first MAC value before boot is illustrated in FIG. 6. When calculating the first MAC value, the arithmetic unit 102 moves or copies the boot target program to the non-volatile memory 105, replaces the signature with the first MAC value, and moves or copies the first MAC value to the non-volatile memory 105. In this manner, the program execution device 1A finishes signature verification before boot is executed, and stores the first MAC value therein.

Figure 7:
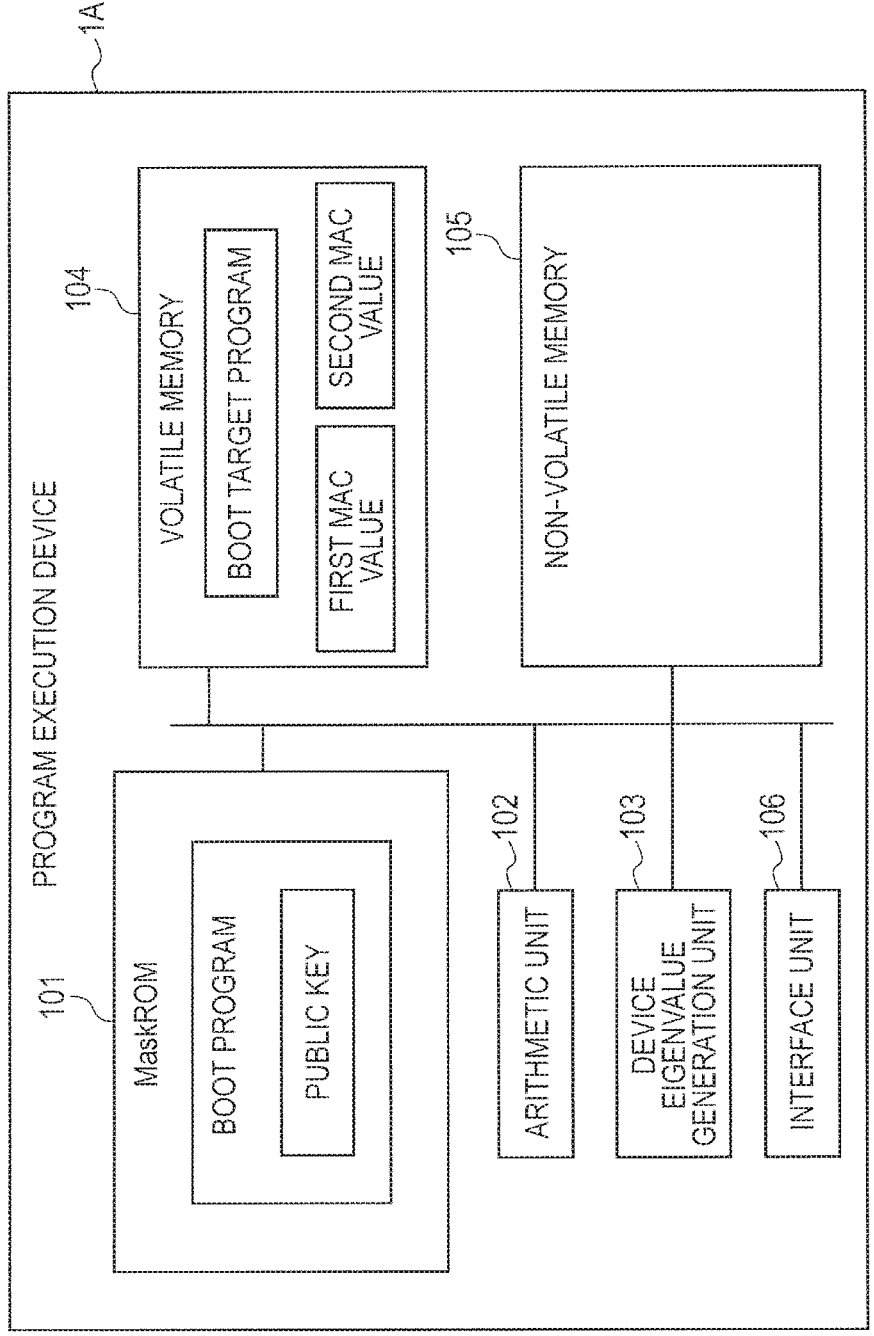
FIG. 7 illustrates a storage state of the boot target program, the first MAC value, and a second MAC value during boot in the first embodiment.

Next, a storage state of the boot target program, the first MAC value, and a second MAC value at boot time is illustrated in FIG. 7. At boot time, the arithmetic unit 102 starts the boot program and moves and copies the first MAC value and the boot target program, stored in the non-volatile memory 105, to the volatile memory 104. The arithmetic unit 102 then calculates a MAC value (second MAC value) of the boot target program based on the device eigenvalue. The arithmetic unit 102 then compares the first MAC value and the second MAC value with each other, thereby performing MAC verification. When the boot target program is legitimate and is not tampered as a result of MAC verification, the arithmetic unit 102 boots the boot target program. In this manner, the arithmetic unit 102 functions as the boot unit 14A.

In the above example, a case where the boot target program and the signature are moved or copied to the volatile memory 104 is described. However, signature verification and/or MAC verification may be performed without moving or copying the program target program and the signature, i.e., while the program target program and the signature are stored in the non-volatile memory 105.

<Process Flow>

Figure 8:
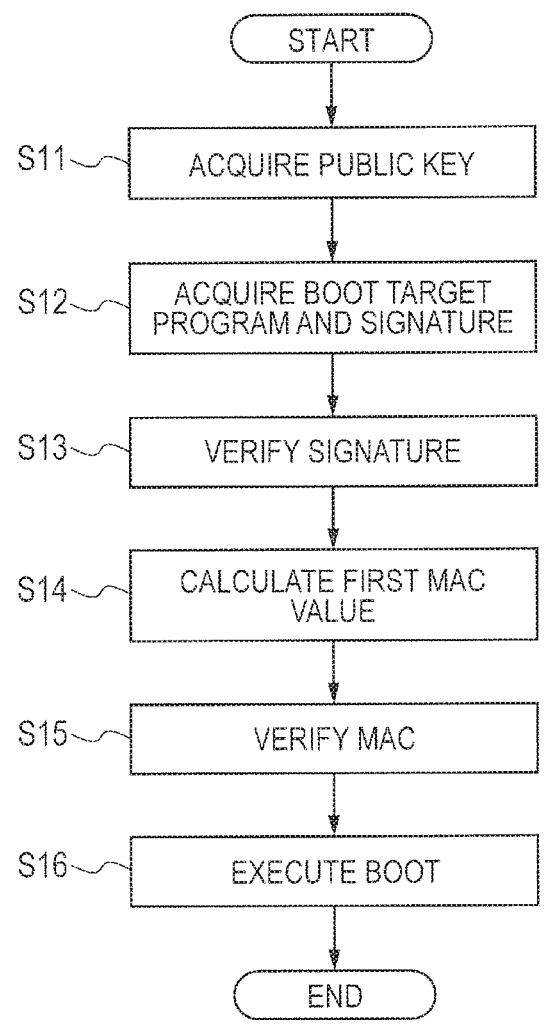
FIG. 8 is a flowchart of a procedure of a process in which the program execution device boots a program to be booted in the first embodiment.

Next, a procedure of a process in which the program execution device 1A boots a boot target program is described with reference to a flowchart in FIG. 8. The acquiring unit 11A acquires a boot program including a public key from the program providing device 2A and stores that boot program (Step S11). The acquiring unit 11A then acquires a boot target program and a signature and stores that boot target program and the signature (Step S12).

The signature verification unit 12A performs signature verification by using the public key and the signature, both acquired by the acquiring unit 11A, before the boot program acquired by the acquiring unit 11A is booted (Step S13).

Subsequently, when the result of signature verification by the signature verification unit 12A is appropriate, the calculation unit 13A calculates the first MAC value by using the device eigenvalue and stores that first MAC value (Step S14). The above processes are processes before boot.

Subsequently, when the boot target program is booted, the boot unit 14A calculates the second MAC value by using the device eigenvalue again and compares that second MAC value and the stored first MAC value with each other to determine that the boot target program is legitimate (Step S15), and executes boot based on the determination result (Step S16).

As described above, the acquiring unit 11A acquires the public key, the signature generated with the secret key corresponding to that public key, and the boot target program associated with that signature. The signature verification unit 12A performs signature verification by using the public key and the signature acquired by the acquiring unit 11A before the boot target program acquired by the acquiring unit 11A is booted. The calculation unit 13A calculates the first MAC value by using the device eigenvalue and stores that first MAC value, when the result of signature verification by the signature verification unit 12A is appropriate. When the boot target program is booted, the boot unit 14A calculates the second MAC value by using the device eigenvalue again, compares that second MAC value and the stored first MAC value with each other to determine that the boot target program is legitimate and is not tampered, and executes boot based on the determination result.

In this manner, signature verification is finished and the first MAC value is calculated before boot. Therefore, it suffices that at boot time, the second MAC value is calculated and MAC verification is performed. Consequently, the program execution device 1A can execute boot earlier without lowering a security level, as compared with a case where signature verification is performed at boot time.

Here, a processing time is compared between a case where signature verification is performed at boot time and a case where signature verification is performed in advance before boot and MAC verification is performed at boot time, with reference to FIGS. 9A to 9C.

FIGS. 9A to 9C illustrate a comparative example of the processing time. FIG. 9A illustrates a processing time in a case where signature verification is performed at boot time and boot is then executed, unlike the above-described method.

The process illustrated in FIG. 9A presupposes that a boot target program and a signature are stored in a non-volatile memory. At a reset timing or a timing at which a power is turned on, boot of the boot target program is started, the boot target program and the signature are copied to a volatile memory, signature verification is performed for the boot target program on the volatile memory, and boot of the boot target program is continued when the signature is appropriate as a result of signature verification. As illustrated in FIG. 9A, a Hash operation and a public key operation are performed at boot time. These operations require 2.13 M (megacycles).

Note that the program size is 1 Mbyte and the signature size is 256 bytes. The Hash operation is performed using SHA256.

FIGS. 9B and 9C illustrate processing times in a case where signature verification is performed in advance and MAC verification is performed at boot time (the processing time in the first embodiment).

Specifically, FIG. 9B illustrates a time required for signature verification and an operation of a MAC value before boot in the first embodiment. The first embodiment requires approximately the same processing time as the processing time in a case where signature verification is performed at boot time in the example of FIG. 9A, because signature verification is performed before boot in the first embodiment. Predetermined processing illustrated in FIG. 9B includes a time required for an operation of the first MAC value and the like.

FIG. 9C illustrates a time required for MAC verification at boot time in the first embodiment. The MAC size is 16 bytes. The public key operation uses hardware code IP (Intellectual Property) developed by the Applicant. The MAC operation uses AES-128-CBC-MAC.

When FIGS. 9A and 9C are compared with each other while an attention is paid to the processing time at boot time, a time required for boot in the above-described embodiment is shorter than in a case where signature verification is performed at boot time because the Hash operation and the public key operation are performed in advance. That is, the program execution device 1A according to the first embodiment can boot early.

Second Embodiment

Figure 10:
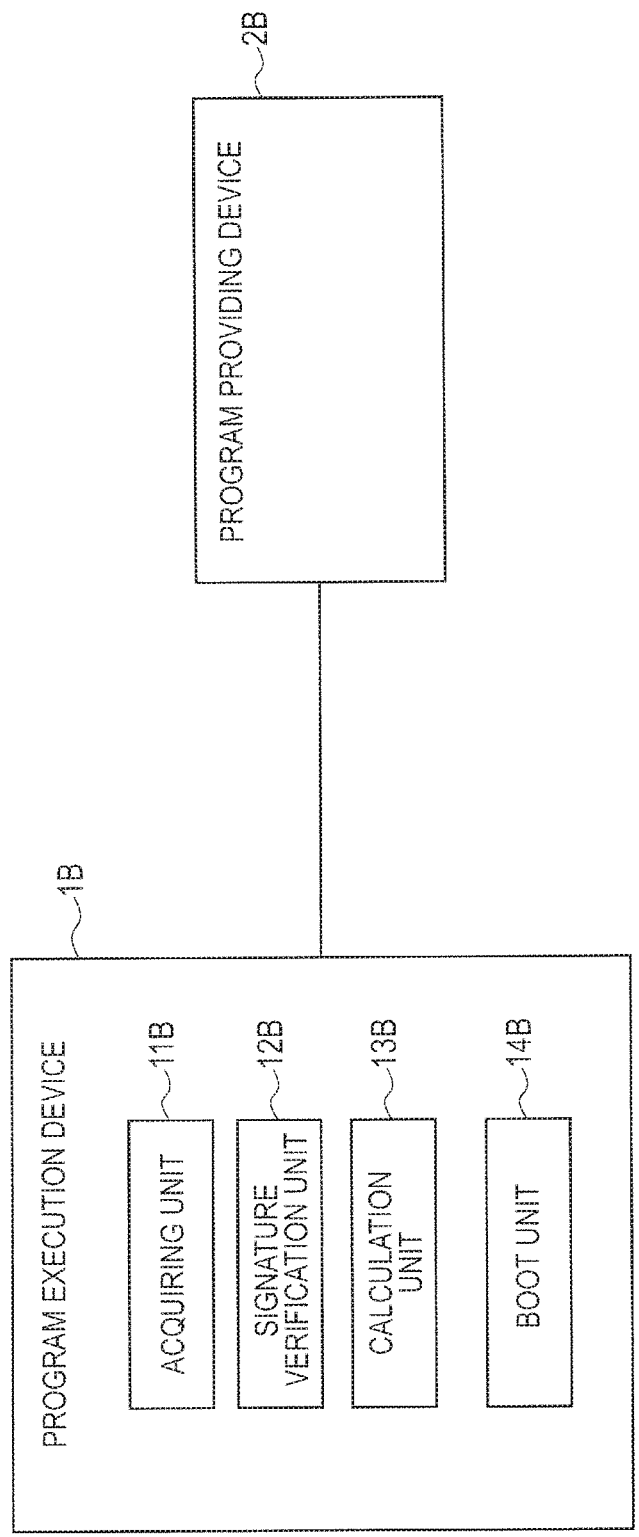
FIG. 10 illustrates the outline of a configuration example of a program execution device according to a second embodiment.

FIG. 10 illustrates the outline of a configuration example of a program execution device 1B according to a second embodiment. The program, execution device 1B is coupled to a program providing device 2B. While the program providing device 2A transmits a boot program in which a public key is implemented in the first embodiment, the program providing device 2B transmits a boot program in which a common key is further implemented. Further, in the second embodiment, the program providing device 2B transmits data obtained by encrypting a boot target program and a signature with the common key to the program execution device 1B.

An acquiring unit 11B acquires the boot target program, and the signature that are encrypted with the common key and also acquires that common key. Specifically, the acquiring unit 11B acquires the boot program including the public key and the common key from the program providing device 2B and stores that boot program. Also, the acquiring unit 11B acquires the boot target program and the signature of that program, encrypted with the above common key, from the program providing device 2B and stores the boot target program and the signature.

Here, a procedure in which the program providing device 2B generates a program to be transmitted to the program execution device 1B is described with reference to FIG. 11.

Figure 11:
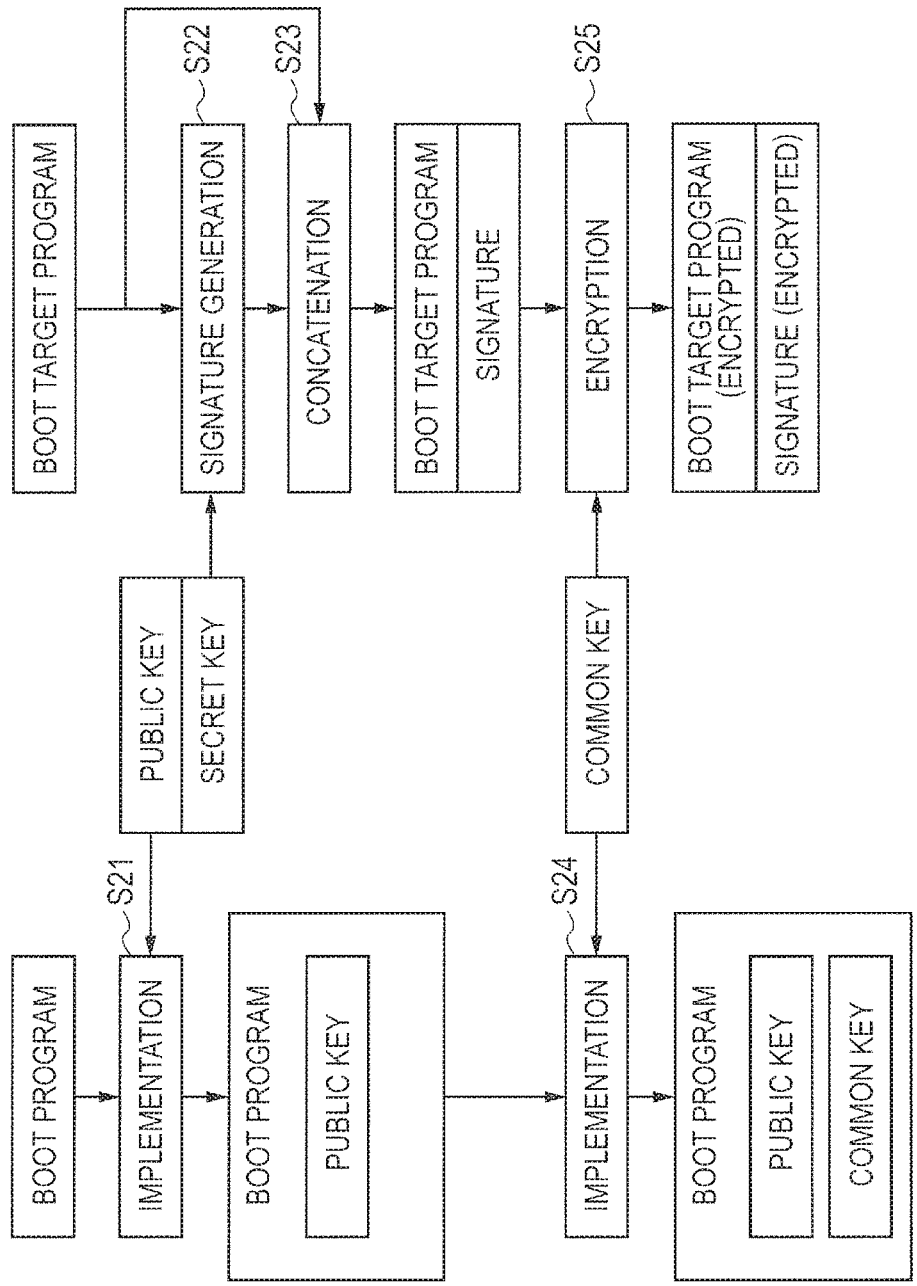
FIG. 11 is a conceptual diagram of a procedure of generating a program to be transmitted to the program execution device, by a program providing device in the second embodiment.

FIG. 11 is a conceptual diagram of the procedure in which the program providing device 2B generates the program to be transmitted to the program execution device 1B.

It is assumed that the program providing device 2B retains a public key, a secret key corresponding to that public key, and a common key. The program providing device 2B also retains a boot program and a boot target program.

First, the program providing device 2B implements the public key in the boot program (Step S21). Subsequently, the program, providing device 2B performs an operation using the secret key for a result of Hash operation performed for the entire boot target program, thereby generating a signature (Step S22). The program providing device 2B then performs a process of associating the boot target program and the signature with each other (concatenation) (Step S23).

Subsequently, the program providing device 2B implements the common key in the above boot program (Step S24). The program providing device 2B encrypts the boot target, program and the signature with the common key (Step S25).

In this manner, the program providing device 2B generates the boot program including the public key and the common key, associates the boot, target program and the signature with each other, and thereafter performs encryption. Also, the program providing device 2B transmits that boot program to the program execution device 1B, and transmits the boot target program and the signature that are associated with each other to the program execution device 1B.

Returning to FIG. 10, a signature verification unit 12B is a unit that decrypts the program and the signature with the common key acquired by the acquiring unit 11B and performs signature verification by using the public key and the decrypted signature. Specifically, the signature verification unit 12B decrypts the boot target program and the signature with the secret key before boot (for example, immediately after the boot target program and the like are stored by the acquiring unit 11B). The signature verification unit 12B then performs an operation using the public key for a result of a Hash operation performed for the entire decrypted boot target program, thereby performing signature verification. The processes after signature verification are the same as those performed by the signature verification unit 12A.

A calculation unit 13B calculates the first MAC value by using a device eigenvalue, generates a key (unique key) by using that device eigenvalue, and encrypts the first MAC value and the boot target program with that key, when the result of signature verification by the signature verification unit 12B is appropriate.

At boot time, a boot unit 14B decrypts the first MAC value and the boot target program encrypted by the calculation unit 13B, calculates the second MAC value for the decrypted boot target program by using the device eigenvalue again, and performs MAC verification.

<Data Transition of Boot Target Program and Other Data>

Figure 12:
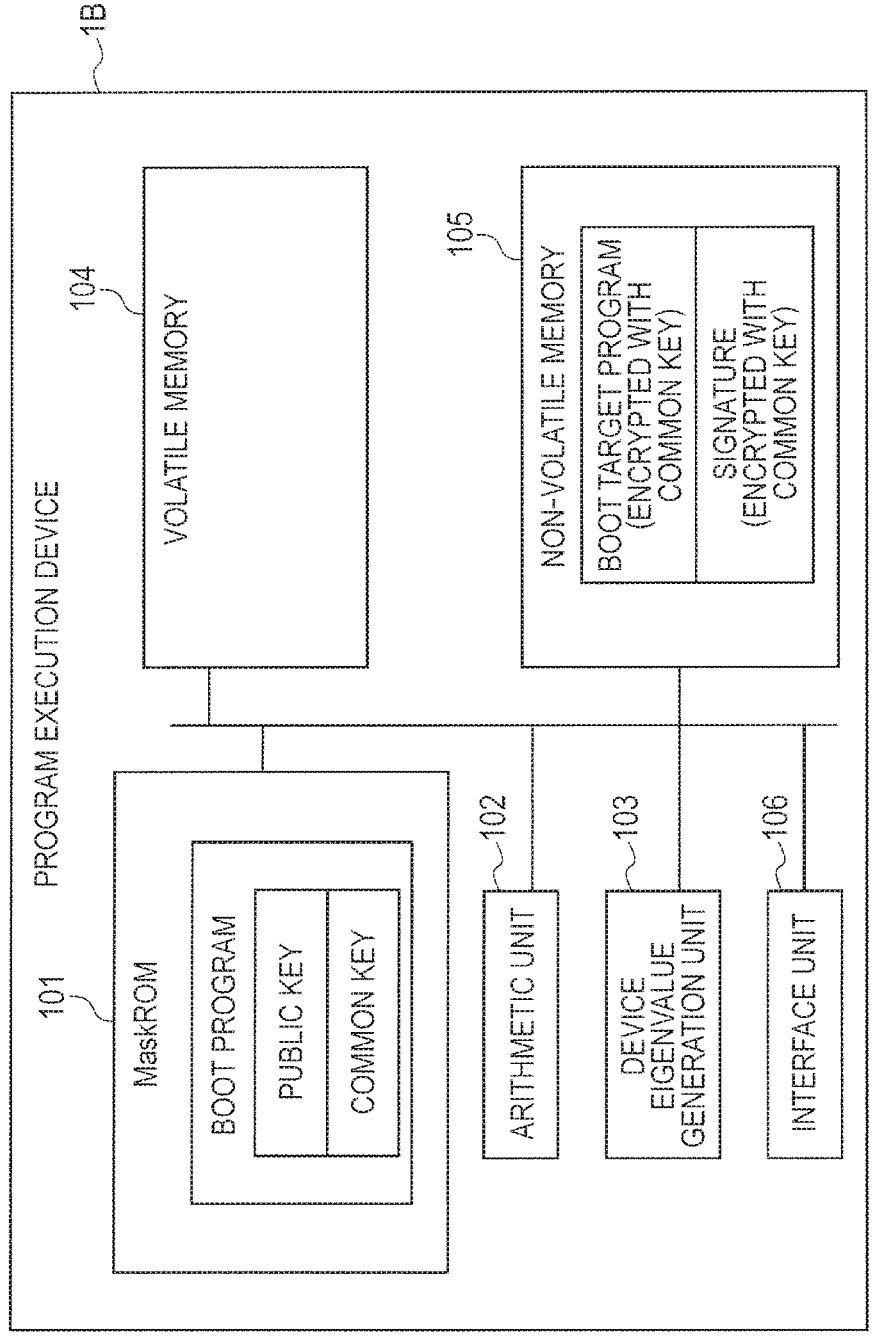
FIG. 12 illustrates a storage state when a boot program, a boot target program, and a signature are acquired in the second embodiment.

Next, data transition of a boot target program and other data until boot is executed is described with reference to FIGS. 12 to 15. First, a storage state when a boot program, a boot target, program, and a signature are acquired is illustrated in FIG. 12. When acquiring the boot program including a common key and the boot target program and the signature that are encrypted with the common key from the program providing device 2B via the interface unit 106, the arithmetic unit 102 stores the boot program in the Mask ROM 101. The arithmetic unit 102 also stores the boot target program, and the signature in the non-volatile memory 105.

In this manner, the arithmetic unit 102 and the interface unit 106 function as the acquiring unit 11B.

Figure 13:
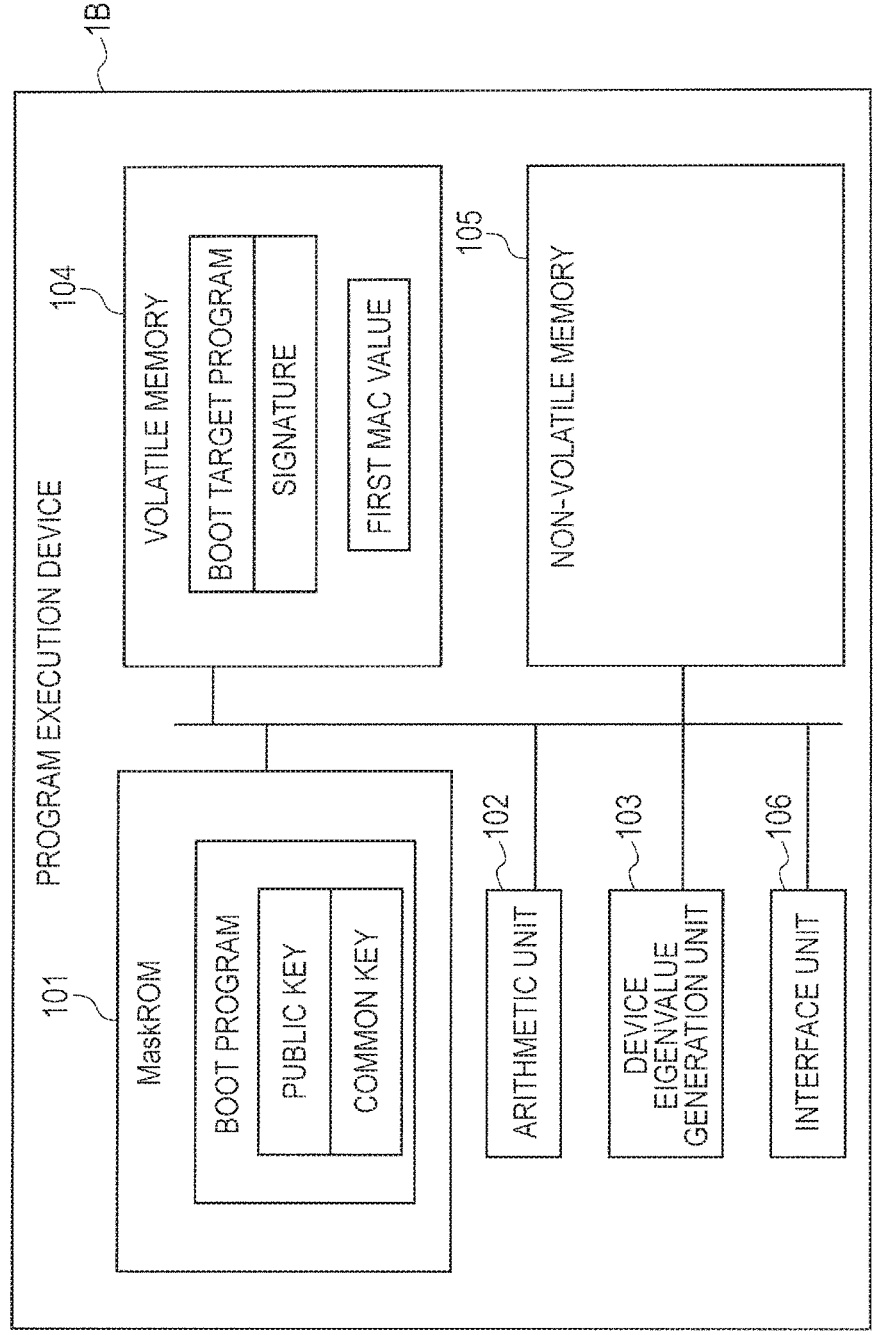
FIG. 13 illustrates a state when signature verification is performed and a MAC value before boot is calculated in the second embodiment.

Next, a state when signature verification, is performed and a MAC value before boot is calculated is illustrated in FIG. 13. The program execution device 1B executes the boot program in signature verification, moves or copies the boot target program and the signature stored in the non-volatile memory 105 to the volatile memory 104, and decrypts the boot target program and the signature with the common key.

The arithmetic unit 102 executes the boot program and performs an operation using a public key for a result of a Hash operation performed for the entire boot target program, thereby performing signature verification. In this manner, the arithmetic unit 102 functions as the signature verification unit 12B. When this signature verification is appropriate, the device eigenvalue generation unit 103 calculates a device eigenvalue and calculates the first MAC value of the boot target program based on that device eigenvalue.

Figure 14:
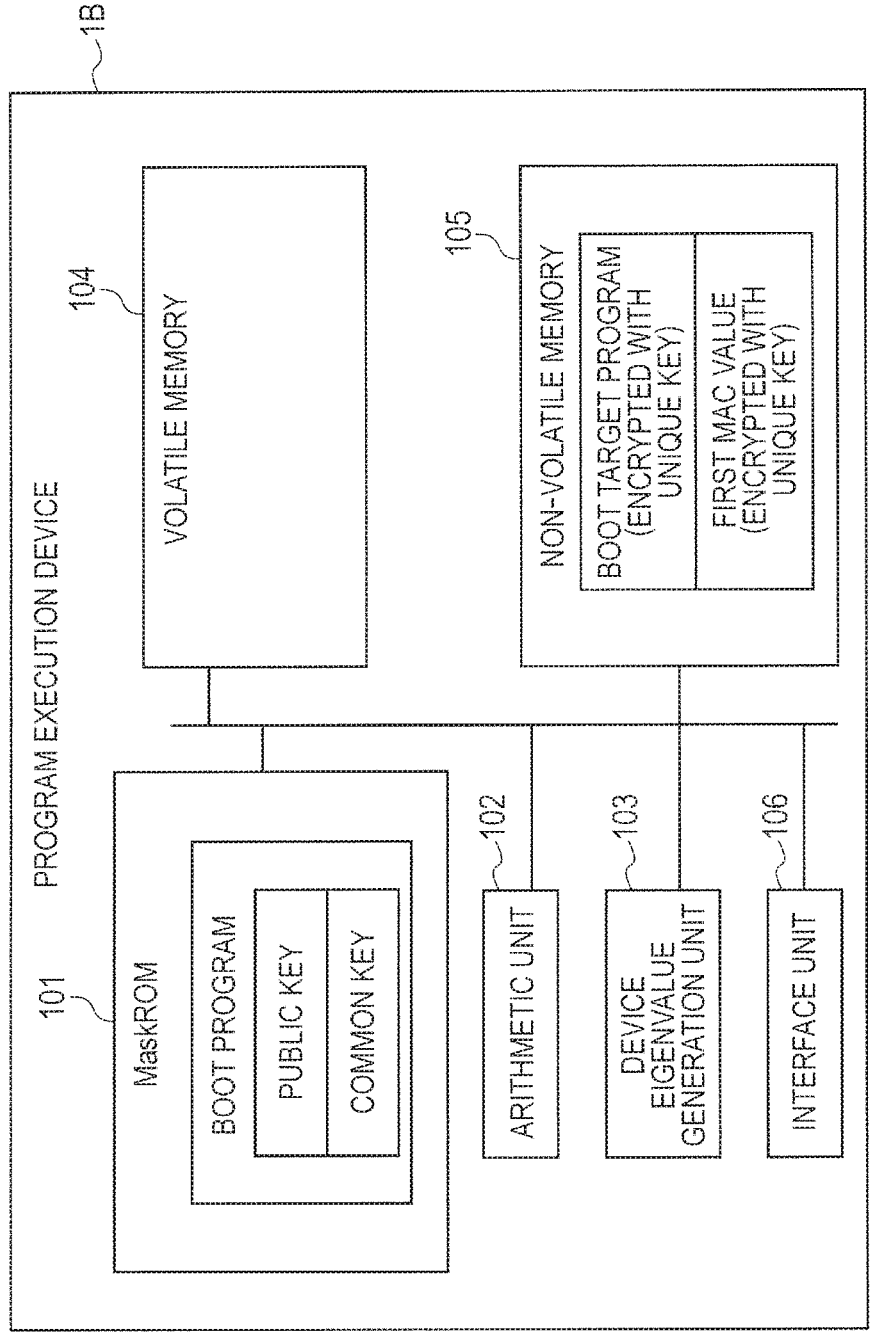
FIG. 14 illustrates a storage state of the boot target program and the first MAC value before boot in the second embodiment.

Subsequently, a storage state of the boot target program and the first MAC value before boot is illustrated in FIG. 14. When calculating the first MAC value, the arithmetic unit 102 encrypts that first MAC value and the boot target program with a key that is based on the device eigenvalue. The arithmetic unit 102 then moves or copies the first MAC value and the boot target program, which are encrypted, to the non-volatile memory 105, and moves or copies the first MAC value with which the signature is replaced to the non-volatile memory 105. In this manner, the program execution device 1B finishes signature verification and stores the first MAC value before boot is executed. In this manner, the arithmetic unit 102 functions as the calculation unit 13B.

Figure 15:
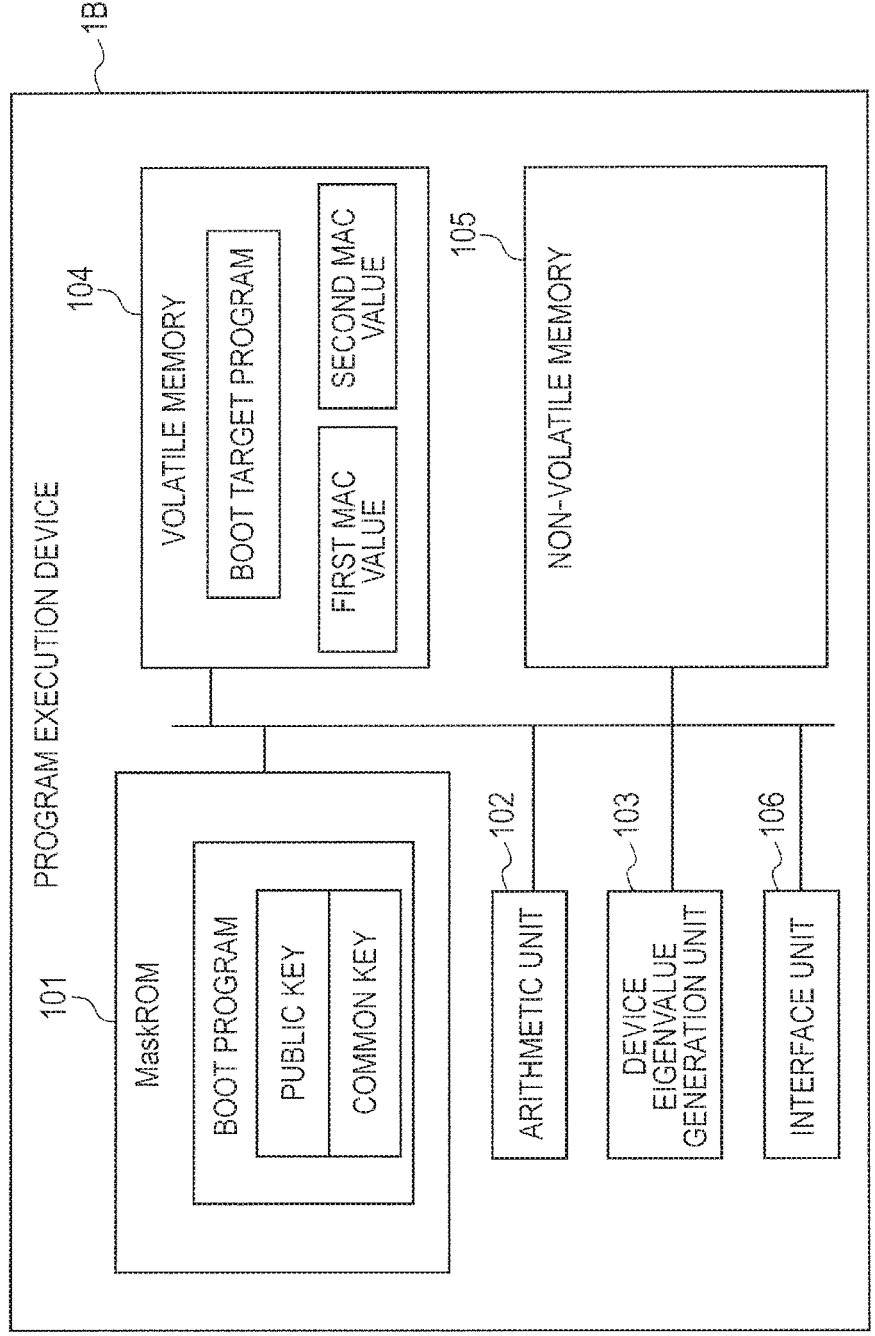
FIG. 15 illustrates a storage of where the boot target program, the first MAC value, and the second MAC value during boot in the second embodiment.

Subsequently, a storage state of the boot target program, the first MAC value, and the second MAC value at boot time is illustrated in FIG. 15. At boot time, the arithmetic unit 102 starts the boot program, decrypts the first MAC value and the boot target program stored in the non-volatile memory 105, and moves or copies them to the volatile memory 104. The arithmetic unit 102 then calculates the second MAC value of the boot target program based on the device eigenvalue. The arithmetic unit 102 then compares the first MAC value and the second MAC value with each other, thereby performing MAC verification. When the boot target program is legitimate and is not tampered as a result of MAC verification, the arithmetic unit 102 boots the boot target program. In this manner, the arithmetic unit 102 functions as the boot unit 14B.

In the above example, a case where the boot target program and the signature are moved or copied to the volatile memory 104 is described. However, signature verification and/or MAC verification may be performed without moving or copying the program target program and the signature, i.e., while the program target program and the signature are stored in the non-volatile memory 105.

<Process Flow>

Figure 16:
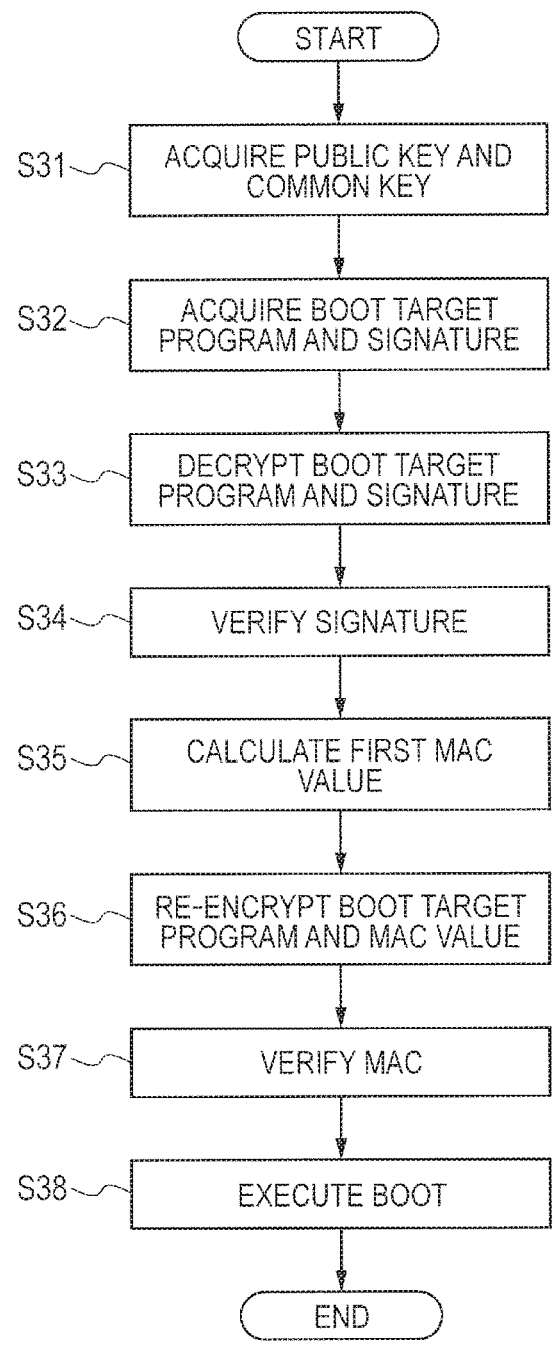
FIG. 16 is a flowchart of a procedure of a process in which the program execution device boots a program to be booted in the second embodiment.

Next, a procedure of a process in which the program execution device 1B boots a boot target program is described with reference to a flowchart in FIG. 16. The acquiring unit 11B acquires a boot program including a public key and a common key from the program providing device 2B and stores that boot program (Step S31). The acquiring unit 11B then acquires a boot target program and a signature that are encrypted with the above common key and stores that boot target program and the signature (Step S32). The signature verification unit 12B decrypts the boot target program and the signature (Step S33).

The signature verification unit 12B performs signature verification by using the public key and the signature acquired by the acquiring unit 11B before the boot target program acquired by the acquiring unit 11B is booted (Step S34).

Subsequently, when the result of signature verification by the signature verification unit 12B is appropriate, the calculation unit 13B calculates the first MAC value by using the device eigenvalue (Step S35). The calculation unit 13B then encrypts the boot target program and the first MAC value with a key that is based on the device eigenvalue (Step S36), and stores the boot target program and the first MAC value that are encrypted. The above processes are processes before boot.

Subsequently, when the boot target program is booted, the boot unit 14B decrypts the boot target program and the first MAC value that are re-encrypted, calculates the second MAC value by using the device eigenvalue again, and compares the second MAC value and the stored first MAC value with each other to determine that the boot target program is legitimate as MAC verification (Step S37), and executes boot based on the determination result (Step S38).

As described above, the acquiring unit 11B acquires a program and a signature that are encrypted with a common key and also acquires that common key. The signature verification unit 12B decrypts the program and the signature with the common key acquired by the acquiring unit 11B and performs signature verification by using the public key and the decrypted signature. The calculation unit 13B generates a key by using a device eigenvalue and encrypts the first MAC value and a boot target program with that key. The boot unit 14B decrypts the boot target program and the first MAC value, thereby performing MAC verification.

In this case, the program execution device 1B keeps a state where the boot target program is encrypted, except during signature verification and Hash verification. Therefore, it is possible to place the boot target program in a more secure state. That is, it is possible to prevent leakage of information, for example, an algorithm implemented in the boot target program saved on the non-volatile memory 105.

Here, a processing time is compared between a case where signature verification is performed at boot time and a case where signature verification is performed in advance and MAC verification is performed at boot time, with reference to FIGS. 17A to 17C.

FIGS. 17A to 17C illustrate a comparative example of the processing time. FIGS. 17A to 17C illustrate results of processing performed under the same condition as that for FIGS. 9A to 9C. FIG. 17A illustrates a processing time in a case where signature verification is performed at boot time and boot is then executed. FIGS. 17B and 17C illustrate processing times in a case where signature verification is performed in advance and MAC verification is performed at boot time (processing time of processes by the second embodiment). Specifically, FIG. 17B illustrates a time required for signature verification and an operation of a MAC value before boot. FIG. 17C illustrates a time required for MAC verification at boot time.

When FIGS. 17A and 17C are compared with each other while an attention is paid to the processing time at boot time, a time required for boot in the second embodiment is shorter than in a case where signature verification is performed at boot time, as in the example illustrated in FIGS. 9A to 9C. That is, the program execution device 1B according to the second embodiment can boot early.

Third Embodiment

FIG. 18 illustrates the outline of a configuration example of a program, execution device 1C according to a third embodiment. The program execution device 1C is coupled to a program providing device 2C. In the third embodiment, the program providing device 2C transmits a program obtained by partly correcting a boot target program that has been transmitted to the program execution device 1C (a reliable patch distributed from a business operator or the like who provides the boot target program), to the program execution device 1C via the Internet or the like.

A program correction unit 15 is a unit that acquires a patch from the program providing device 2C and reflects correction of a program. When receiving the patch from the program providing device 2C, the program correction, unit 15 reflects the patch on the boot target program. When reflecting the patch on the boot target program, the program correction unit 15 notifies a calculation unit 13C that the program has been corrected.

The program correction unit 15 may be configured to correct the boot target program in response to acquisition of a program to be added to the boot target program, or may be configured to receive a delete request of a portion of a function of the boot target program, and then correct the boot target program, i.e., deletes the portion of the function of the boot target program in response to the delete request.

A calculation unit 13C is a unit that, when the program has been corrected by the program correction unit 15, calculates the first MAC value for the corrected program again. When being notified by the program correction unit 15 that the program has been corrected, the calculation unit 13C calculates the first MAC value for the corrected program and performs replacement with, that first MAC value.

<Data Transition of Patch and Other Data>

Figure 19:
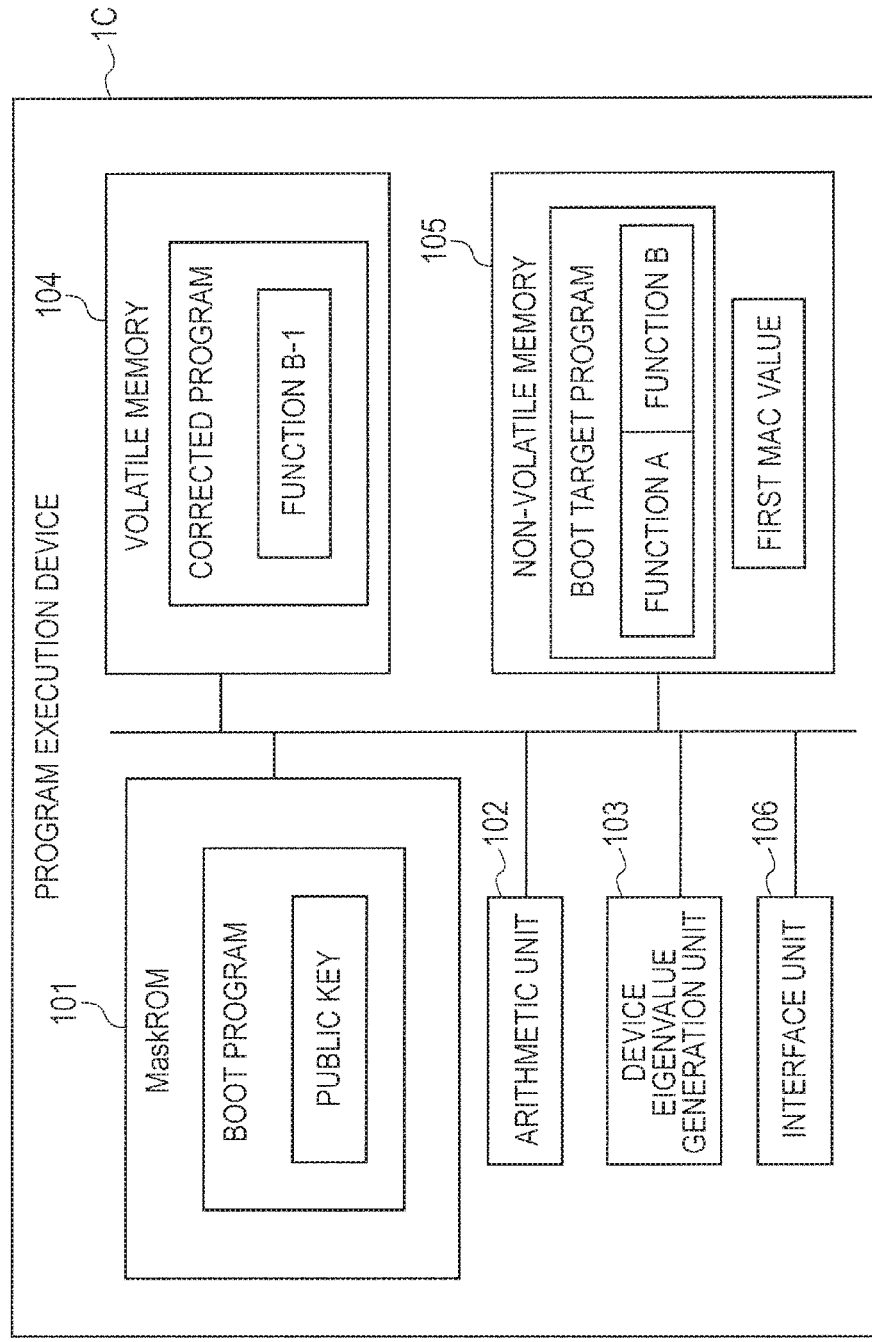
FIG. 19 illustrates a storage state when a patch is acquired according to the third embodiment.

Next, data transition of a patch and other data until boot is executed is described with reference to FIGS. 19 and 20. First, a storage state when a patch is acquired is illustrated in FIG. 19. It is assumed that signature verification has been already finished for a boot target program (a program having a function A and a function B), the first MAC value has been calculated, and that first MAC value and the boot target program are stored in the non-volatile memory 105. In this state, when acquiring a patch (a program of a function B-1 that is a corrected version of the function B) from the program providing device 2C via the interface unit 106, the arithmetic unit 102 stores that patch in the volatile memory 104. In this manner, the arithmetic unit 102 and the interface unit 106 function as the program correction unit 15.

Figure 20:
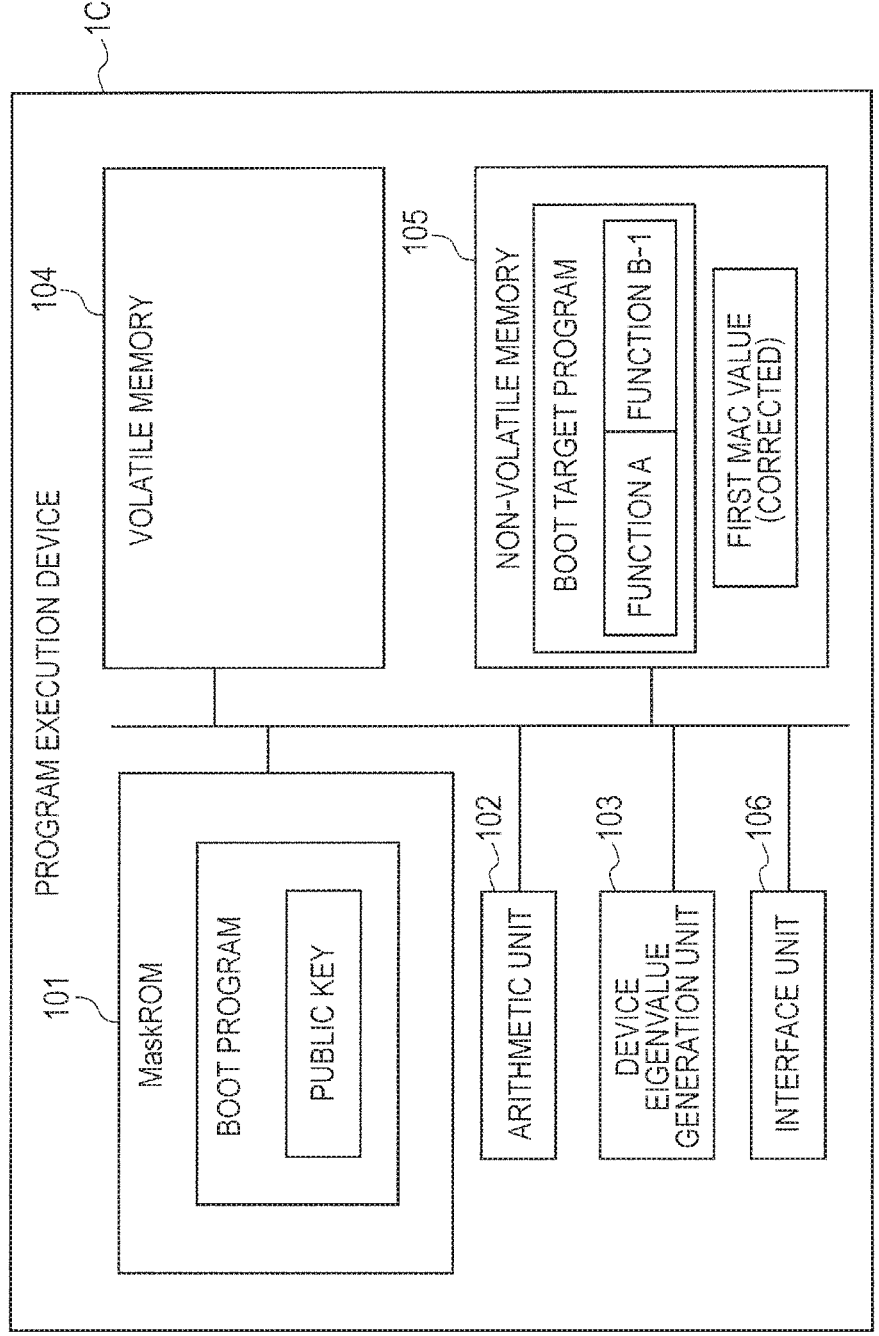
FIG. 20 illustrates a state where a program to be booted and the first MAC value are corrected according to the third embodiment.

Subsequently, a state where the boot target program and the first MAC value have been corrected is illustrated in FIG. 20. When acquiring and storing the patch, the arithmetic unit 102 moves or copies the boot target program and the first MAC value to the volatile memory 104. The arithmetic unit 102 then reflects the patch on the boot target program. The arithmetic unit 102 then calculates the first MAC value for the corrected boot target program again. In this manner, the arithmetic unit 102 functions as the calculation unit 13C. Subsequently, the arithmetic unit 102 stores the recalculated first MAC value and the boot target program on which the patch is reflected in the non-volatile memory 105.

<Process Flow>

Next, a procedure of a process in which, when acquiring a patch, the program execution device 1C reflects correction of a program and corrects the first MAC value is described with reference to a flowchart in FIG. 21.

First, the program correction unit 15 acquires a patch from the program providing device 2C and stores that patch (Step S41). The program correction unit 15 then corrects a boot target program (Step S42). The calculation unit 13C calculates the first MAC value again (Step S43) and corrects the first MAC value (Step S44).

Also in a case where the boot target program and the first MAC value are stored while being encrypted as described in the second embodiment, similar processes to those described above can be performed. For example, when acquiring the patch, the program execution device 1C decrypts the boot target program and the first MAC value with a unique key by using a device eigenvalue. The program execution device 1C then reflects the patch on the boot target program and calculates the first MAC value again. It suffices that the program execution device 1C then encrypts the corrected boot target program and the corrected first MAC value with the unique key and stores them.

As described above, when the acquiring unit 11C acquires a patch, the program correction unit 15 reflects the patch on a boot target program. In accordance with this, the calculation unit 13C re-calculates (corrects) the first MAC value.

In this case, the program execution device 1C corrects the first MAC value by using a fact that the patch has been reflected as a trigger. Therefore, even if the program is corrected, MAC verification can be preformed appropriately.

In the above, the invention made by the inventors of the present application has been specifically described by way of the embodiments. However, it is naturally understood that the present invention is not limited to the aforementioned embodiments, and can be changed in various ways within the scope not departing from the gist thereof. For example, the aforementioned embodiments are described in detail for the purpose of clearly explaining the present invention, but is not necessarily limited to include all the described components. Further, addition can be made for a portion of the configuration of each of the aforementioned embodiments, or a portion of the configuration of each of the aforementioned embodiments can be deleted or replaced with another configuration.

The present invention is applicable to a device that boots a program.

What is claimed is:

1. A semiconductor device comprising:
a processor; and
a memory comprising programs, when the programs are executed by the processor, cause the processor to function as:
an acquiring unit that acquires a public key, a signature generated with a secret key corresponding to the public key, and a program associated with the signature;
a signature verification unit that performs signature verification by using the public key and the signature acquired by the acquiring unit, before the program acquired by the acquiring unit is booted;
a calculation unit that calculates a determination value for determining that the program is legitimately manufactured and is not tampered, by using information identifying an own device thereof and stores the determination value, when the signature is verified to be appropriate by the signature verification unit; and
a boot unit that recalculates the determination value by using the information identifying the own device, performs a determination process that compares the recalculated determination value and the stored determination value with each other to determine that the program is legitimately manufactured and is not tampered, and executes boot based on a result of the determination, when the program is booted,
wherein the acquiring unit acquires a common key, and acquires the program and the signature that are encrypted using the common key,
wherein the signature verification unit decrypts the program and the signature using the common key, and performs signature verification by using the public key and the decrypted signature,
wherein the calculation unit generates a key by using the information identifying the own device and re-encrypts the calculated determination value and the program using the key, and
wherein the boot unit decrypts the program and the stored determination value using the key generated by the calculation unit, and performs the determination process.

2. The semiconductor device according to claim 1, the processor further functions as a program correction unit that acquires a patch in which the program is corrected and reflects the patch,
wherein, when correction is performed by the program correction unit, the calculation unit recalculates the determination value for the program on which the correction is reflected and stores the recalculated determination value.

3. A boot method to be executed by a semiconductor device that boots a program, the boot method comprising:
acquiring a public key, a signature generated with a secret key corresponding to the public key, and a program associated with the signature by the semiconductor device;
performing signature verification by using the acquired public key and the acquired signature, before the acquired program is booted;
calculating a determination value for determining that the program is legitimately manufactured and is not tampered by using information identifying an own device thereof, and storing the determination value, when the signature is verified to be appropriate in the signature verification; and
recalculating the determination value by using the information identifying the own device, performing a determination process that compares the recalculated determination value and the stored determination value with each other to determine that the program is legitimately manufactured and is not tampered, and executing boot based on a result of the determination, when the program is booted,
wherein a common key is also acquired,
wherein the program and the signature are encrypted with the common key,
wherein the program and the signature are decrypted with the common key, and the signature verification is performed using the public key and the decrypted signature,
wherein a key is generated using the information identifying the own device and the calculated determination value and the program are re-encrypted with the key, and
wherein the program and the stored determination value are decrypted with the key, and the determination process is performed.

4. A non-transitory memory storing a boot program, when executed by a semiconductor device, causes the semiconductor device to acquire a public key, a signature generated with a secret key corresponding to the public key, and a boot target program associated with the signature, and further causes the semiconductor device to:
perform signature verification by using the public key and the signature, before the boot target program is booted;
calculate a determination value for determining that the boot target program is legitimately manufactured and is not tampered by using information identifying an own device thereof, and store the determination value, when the signature is verified to be appropriate in the signature verification; and
recalculate the determination value by using the information identifying the own device, perform a determination process that compares the recalculated determination value and the stored determination value with each other to determine that the boot target program is legitimately manufactured and is not tampered, and execute boot based on a result of the determination, when the boot target program is booted,
wherein a common key is also acquired,
wherein the program and the signature are encrypted with the common key,
wherein the program and the signature are decrypted with the common key, and the signature verification is performed using the public key and the decrypted signature,
wherein a key is generated using the information identifying the own device and the calculated determination value and the program are re-encrypted with the key, and
wherein the program and the stored determination value are decrypted with the key, and the determination process is performed.

* * * * *